Sept. 2, 1947.  E. M. CALLENDER  2,426,964
ELECTRONIC ARC WELDER
Filed July 15, 1944  3 Sheets-Sheet 1

INVENTOR
EDWIN M. CALLENDER
BY
*John P. Tarbox*
ATTORNEY

Sept. 2, 1947.　　　　E. M. CALLENDER　　　　2,426,964
ELECTRONIC ARC WELDER
Filed July 15, 1944　　　　3 Sheets-Sheet 2

INVENTOR
EDWIN M. CALLENDER
BY
*John P. Farbo*
ATTORNEY

*INVENTOR*
EDWIN M. CALLENDER
BY John P. Jarbox
*ATTORNEY*

Patented Sept. 2, 1947

2,426,964

UNITED STATES PATENT OFFICE 2,426,964

ELECTRONIC ARC WELDER

Edwin M. Callender, Cynwyd, Pa., assignor to The Budd Company, Philadelphia, Pa., a corporation of Pennsylvania Application July 15, 1944, Serial No. 545,063

8 Claims. (Cl. 315—205)

1

This invention relates to arc welding apparatus. More particularly, the invention relates to direct current arc welding apparatus in which the power is supplied from an alternating current source.

The objects of the invention may be mentioned as follows: the provision of a circuit and associated apparatus which will permit employment of an arc welding unit in conjunction with ordinary commercial alternating current voltages, such as 110 volts; the provision of circuit means which will permit current use from a commercial voltage source in wide ranges; the utilization of circuit arrangements which cooperate reduce the weight and increase the maneuverability of the equipment to an exceptional degree; the provision of arc welding apparatus which makes possible an efficient substitution of electronic devices for rotating arc welding machinery; the provision of a circuit which lends itself to plural uses, such as welding, battery charging and the like; and in general the provision of a system of arc welding which is compact in physical structure and simple and efficient in manipulation and welding action.

In order to set forth my invention, I have described hereinbelow certain modifications thereof which are shown in the accompanying drawings, of which:

In ordinary welding uses, it is not essential that the equipment used be light in weight and portable to an appreciable extent, since most welding operations are carried on under more or less stationary conditions. Recently, however, need has arisen, particularly in military operations in connection with aircraft and the like, for equipment which is readily portable, which is light and compact in physical set-up and which is adaptable for use on ordinary commercial voltages. To meet this general need and to fulfill the objects of the invention hereinabove stated, I have ascertained that the use of power

2 rectifiers such as ignitrons is feasible in arc welding and that by a specially devised circuit I am able to employ commercial voltages to supply current in ranges extending from as low as 10 amperes to as high as 300 amperes without modification of the circuit other than may be required by the movement of switches.

Figure 1:
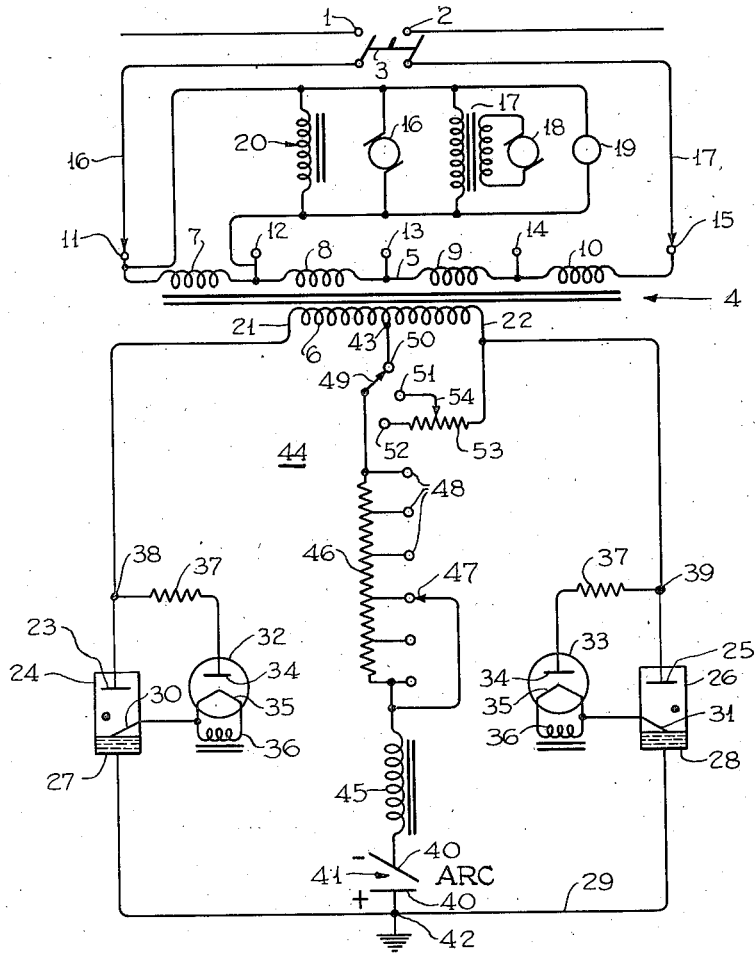
Figure 1 is a wiring diagram of a preferred circuit.

Referring to Figure 1 of the drawings, there is indicated a source 1 and 2 of commercial power which may be, for example, 110 volts single-phase alternating current of 60-cycle frequency. Current from this source is led through a main switch 3 to a main transformer 4 having a primary 5 and a secondary 6. Preferably the primary 5 is formed of a plurality of sections 7, 8, 9 and 10, the ends of these sections leading to terminals as shown 11, 12, 13, 14 and 15. The main leads 16 and 17 from the power source are adapted for connection to any one of the terminals 11 to 15 so that by proper placement, adjustment of the primary voltage may be made as desired.

Intermediate the taps 11 and 12 is positioned an auxiliary power circuit adapted for approximately 110 volts for supplying power to auxiliary equipment, such as the pump motor 16 for supplying cooling fluid to the ignitron circuit, the transformer 17 for supplying current to the fan motor 18, the pilot light 19 for indicating energization of the circuit and the transformer 20 adapted for supplying heating current to the filaments of the rectifier tubes.

The terminals 21 and 22 of the secondary 6 of the transformer 4 are each connected to ignitrons for supplying power to the welding circuit. The terminal 21 has connection to the anode 23 of the ignitron tube 24 and the terminal 22 has connection to the anode 25 of the ignitron 26. The cathodes of these two tubes numbered respectively 27 and 28 are connected together by grounded conductors 29. The igniters 30 and 31 of the ignitrons are normally energized by rectifier tubes 32 and 33, each tube including an anode 34 and cathode filaments 35 and a secondary coil 36 associated with the primary of transformer 20 in the auxiliary supply circuit. Resistors 37 are included in the anode circuit of the rectifiers, the connection to these tubes being made from the anode to points 38 and 39 in the anode circuits of the ignitrons and from the igniters 30 and 31 directly to the filament circuit of the rectifiers.

The welding electrodes 40 of the arc welder 41 are placed in a branch circuit interposed between a point 42 on the conductor 29 and the mid-point 43 of the secondary 6 of transformer 4, this circuit connecting the two ignitron circuits so that voltage originating in the transformer 4 and passing through either ignitron has a return circuit through the arc electrodes and the branch circuit between points 42 and 43. This branch circuit is designated by the numeral 44.

The branch circuit 44 includes, in addition to arc electrodes 40, the reactor coil 45 and the tapped resistor 46, by means of which control of the circuit values may be obtained through shifting of the movable contact 47 between the various terminals or resistor terminals 48 as indicated. There is also included in this circuit a switch 49 adapted to engage contacts 50, 51 and 52. Of these contacts, 50 has direct connection to the mid-point 43 of the transformer secondary 6, and at this connection high values of current pass through the branch circuit 44 and the included arc electrodes; contact 52 has direct connection through a resistor 53 to the terminal 22 of the secondary 6. The connection of the branch circuit 44 by means of switch 49 to the terminal 52 sets up the circuit arrangement for low current values. Medium current values are attained by a tap 54 connected to the contact 51 to which, as desired, switch 49 may be connected.

The operation of this preferred modification of the invention may now be described.

Figure 5:
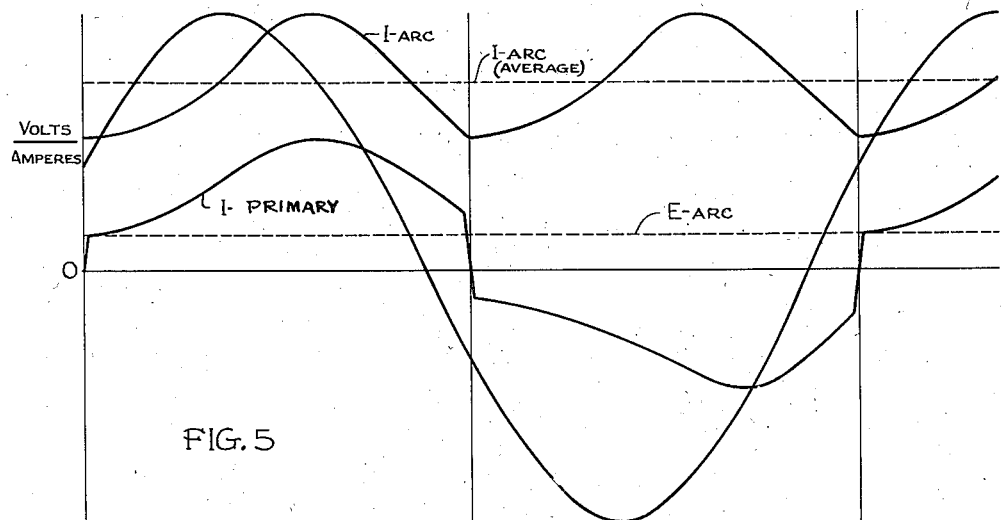
Figures 5 and 6 are views illustrating families of curves, Figure 5 indicating the high voltage connections, and Figure 6 the low current connections.

It will first be assumed that high current values are desired for the arc welding circuits, such as may be included within a range of approximately 60 to 150 amperes. For this connection, as previously indicated, the switch 49 is connected to the contact 50 and movable terminal 47 of the resistor 46 is adjusted to any desired predetermined terminal 48 effective to give the desired current value. If with this connection the main switch 3 is closed, power is at once transmitted to the transformer 4 which supplies current of alternating voltage to the ignitron circuits. Alternately, current will pass through ignitron 24 and ignitron 26 in each alternation, the return path of the current being through the return branch 44 including the arc welder 41. This current without the reactor 45 would be variable but unidirectional, but with the reactor 45 the current assumes a more constant value due to the smoothing action of the reactor. The characteristics of the line source voltage, the arc voltage, the source current and the arc current are indicated in Figure 5 of the drawing for this high current connection. In this curve it is apparent that a substantial current of fair constancy flows between the arc electrodes 40 which is unidirectional.

Figure 3:
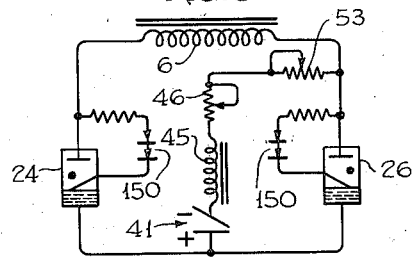
Figure 3 is a diagram of the arrangement of Figure 1 as utilized for low current.
Figure 6:
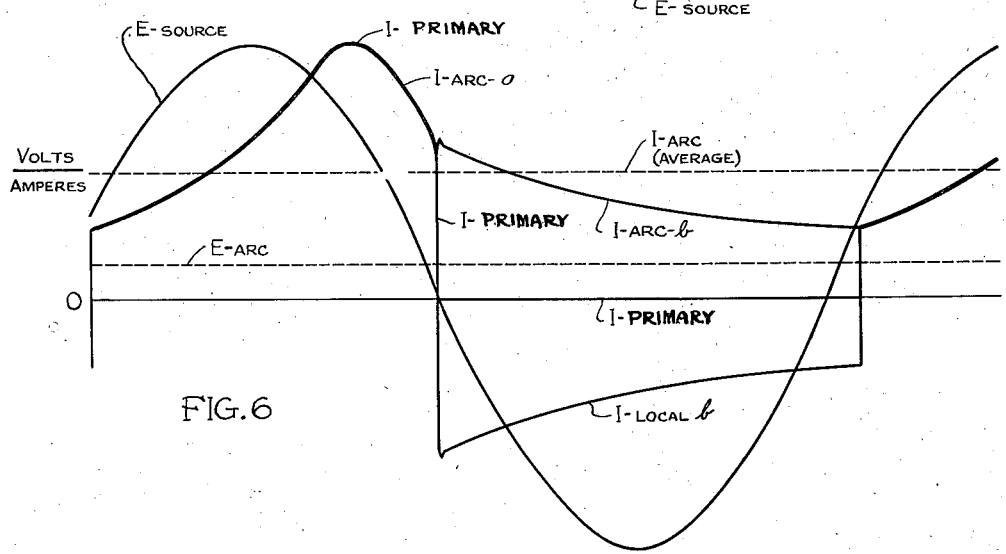

If it be desired to secure a current flow through the arc of low current value, the switch 49 is shifted to the contact 52 to secure the general connection, as shown in Figure 3 of the drawing. For this connection, it is apparent that current introduced by the transformer 4 is effective only through the ignitron 24, since the return circuit 44 is now connected to the anode of the ignitron 26 preventing the development of voltage across this ignitron. With proper potential conditions, current will flow, during a given positive half-cycle, through ignitron 24 and through the branch circuit 44 to the point 22 of the secondary 6, as shown by the curves, the letters $a$ and $b$ indicating the positive and negative half cycles, respectively, as transmitted successively through the ignitrons 24 and 26. "I-primary" indicates the current variation in the primary 5 of the main transformer 4, and "I-arc-$a$" indicates the current flow through the ignitron 24 and the arc electrodes 41 during the specified $a$ or positive half cycle. On the termination of the source voltage half-cycle, however, current is cut off in the ignitron 24 circuit and drops to zero. Cessation of current in the arc circuit is prevented, however, by the presence of the reactor 45 which supplies inductively stored energy to the branch circuit 44 in the local $b$ circuit including the ignitron 26. This local current flow is indicated by the curve I-arc-$b$, as shown in Figure 6, this curve being in continuation of the I-arc-$a$ curve, and consequently indicating that a positive current continues to flow through the arc during the negative or $b$ half cycle. The characteristics of the reactor are so chosen, in conjunction with the voltage and other characteristics, as to maintain during the half-cycle in which current ceases to flow through ignitron 24, a flow of current in branch 44. While this flow is declining according to the time constant of the circuit, nevertheless the magnitude is such as to maintain a substantial amount of current in the arc electrode circuit and thus secure on the average a continuity in the arc welding current between half-cycles where normally the source voltage is ineffective. This inductive current flow is maintained until the ignitron 24 strikes due to positive half-cycle voltage in the $a$ circuit, as shown in the figure. The curve marked I-local-$a$ is indicated as showing the reverse current flowing in the local-$b$ circuit including the ignitron 26 during the inactive phase of ignitron 24.

Figure 4:
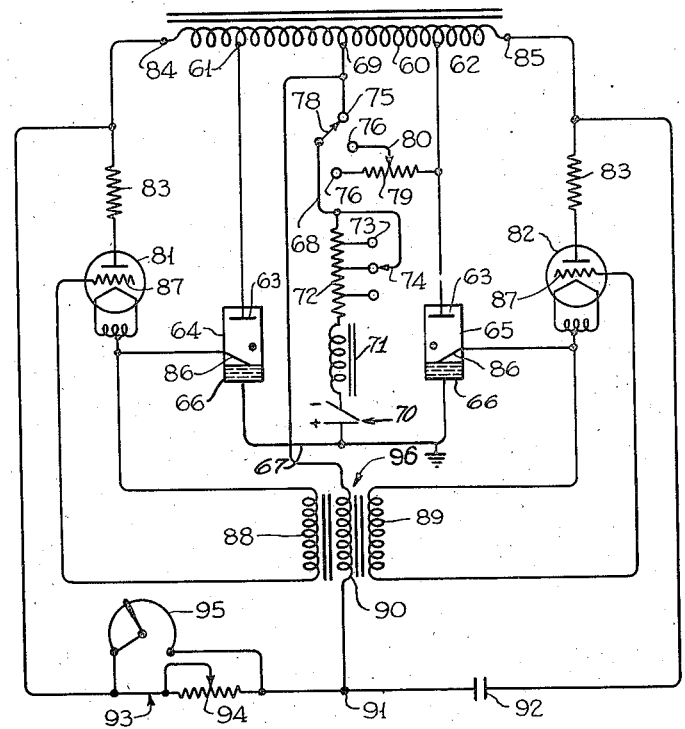
Figure 4 is the general arrangement of Figure 1 modified to include a phase shift circuit as an auxiliary control feature.

I have indicated in Figure 4 a modification of the circuit arrangement of Figure 1 in that I utilize igniter control means for changing the striking point in the cycle of the source voltage. Referring to this figure, I have indicated the secondary 60 corresponding to secondary 6 of transformer 4 with points 61 and 62 adjacent but displaced from the ends of the transformer connected to the anodes 63 of ignitrons 64 and 65. Similarly as in the case of the Figure 1 modification, the cathodes 66 of the ignitrons are connected together by a conductor 67 and grounded. Also, I have provided a branch shunt circuit 68 connecting midpoint 69 of the secondary 60 to the grounded connector 67, and in this branch circuit are positioned in series the arc electrodes of arc welder 70, the reactor 71, the tapped resistor 72 provided with taps 73 and movable contact 74 and the contacts 75, 76 and 77 with the switch 78, by means of which current variation in the circuit may be made. Contact 76, as in the preferred modification, is connected to the point 62 through a resistor 79, and contact 76 is provided with a slide terminal 80 in engagement with the resistor 79.

The elements of this circuit, as above mentioned, are substantially as shown in the Figure 1 modification. I have added to the stated elements, however, thyratron tubes 81 and 82, anodes in these tubes having connection through resistors 83 to the terminals 84 and 85 of the transformer secondary 60. The cathodes of these thyratrons have connection to the igniters 86 of the ignitrons. Each thyratron has a grid 87 energized by the secondaries 88 and 89, respectively, to which it is connected in series with the cathode of the tubes. These secondaries are energized by the primary 90 of the transformer 91, this primary having connection at one end to the point 69 on the transformer secondary 60 and at the other end to a point 91 intermediate a capacitor 92 and a variable resistor unit 93. The other terminal of the capacitor is connected to the anode of the thyratron 82, and the other end of the resistor 93 is connected to the anode of the thyratron 81, the resistor and capacitor being in series. In order to secure a gradient of adjustment, the resistor 93 includes a rough adjustment variable resistor 94 and in parallel therewith a fine adjustment resistor 95.

Inspection of Figure 4 reveals the fact that the mid-point 69 divides the secondary of the transformer into two rectifier units each in conjunction with the capacitor 92 and resistor unit 93 forming branches of a phase change unit, the bridge of which extends from the transformer point 69 of secondary 60 to the point 91 on the conductor joining the capacitor 92 and the resistor unit 93. Consequently, it may be seen that for any given resistance value of the resistor unit 93 a definite phase value is given to the transformer 91 which is effective upon the grids 87 on the thyratrons 81 and 82. By manual adjustment of the rough and fine variable resistors 94 and 95 of the resistor unit 93 the value of the phase difference between the grids 87 and the source voltage may be changed at will, and by such change the time period in which current flows in the ignitrons in any given half-cycle may be changed to supply variable heat energy at the arc electrodes.

It is, of course, apparent that this phase change adjustment is usable in conjunction with the major current adjustment secured by the variable resistor 72 and by the switch 78 in the branch circuit 68.

Figure 8:
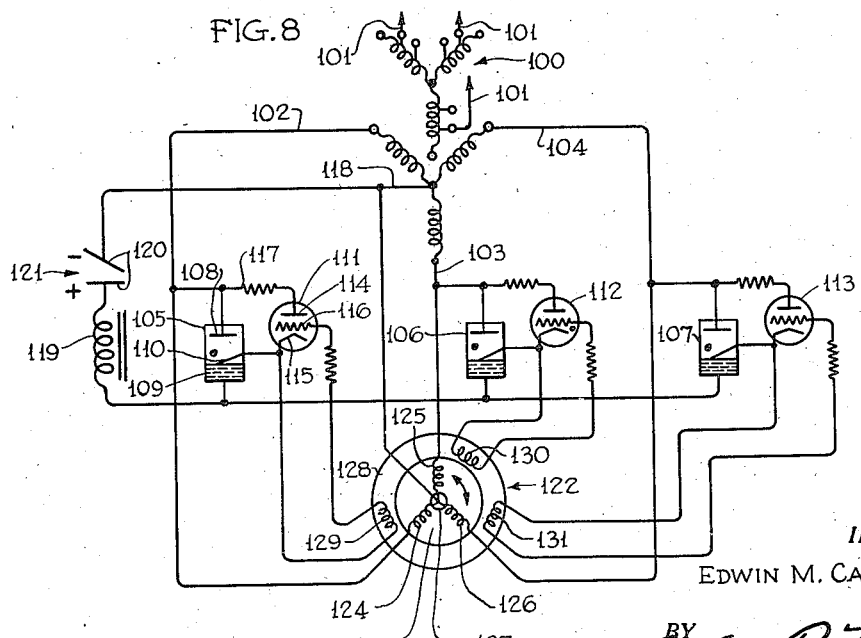
Figure 8 is a modification of the circuit illustrating the adaptation of a three-phase power source to the welding circuit.

In Figure 8 there is illustrated a modification of the invention showing the application of a polyphase power source to arc welding in conjunction with the use of ignitrons. The numeral 100 indicates a three-phase power source by way of example, terminal connections being at tapped points, as 101. Current through this source is supplied to the various branch circuits 102, 103 and 104 including the secondaries of the three-phase transformers, and in these various branch circuits are connected ignitrons 105, 106 and 107. These ignitrons are of the usual gaseous-discharge type having an anode 108, a mercury cathode 109 and an igniter 110. Associated with each ignitron are thyratron tubes 111, 112 and 113, each of these tubes having an anode 114, a cathode 115 and a grid 116, the anode of each thyratron being connected to the anode 108 of the associated ignitron through a resistor 117, and the cathode of each thyratron having connection to the igniter 110 of each ignitron. The cathodes of each ignitron are connected to the return circuit 118 of the secondary system through a choke or reactor coil 119 and the electrodes 120 of the arc welder 121 so that current passing through each ignitron in phase passes also through the arc welder.

In order to control the heat energy supplied the arc welder, means are supplied to vary the point in the half-cycle of current flow through the ignitrons at which the tube strikes. This control is embodied in an induction voltage regulator unit 122 which comprises a primary rotor section 123 having the primary coils 124, 125 and 126 and subject to limited rotation by means of the hand wheel 127, and the stator element 128 having secondaries 129, 130 and 131 each related inductively to its associated primary coil. The primary coils 124, 125 and 126 are connected directly to the branch mains 102, 103 and 104, and the secondaries 129, 130 and 131 are connected respectively to the grids 116 of thyratron tubes 111, 112 and 113. Accordingly, by manual adjustment of the rotor 123 of the unit relative to the stator 128, the induction of the transformers and consequently the voltage as applied to the grids may be modified. Thus the time in the half-cycle of voltage as applied to the thyratron anode at which the thyratron strikes may thus be modified to secure a modification in the active period of current flow through the ignitrons and a control over the heat energy supplied to the arc electrodes.

It is pointed out that only a half wave of each phase is used in the diagrammatic showing of Figure 8, but adaptations may be readily made by employing inversely connected ignitrons in accordance with conventional practice for utilizing the full cycle of each phase branch. Also, it is evident that while the induction voltage regulator as described provides an effective heat control means, other equivalent means, such as a phase shift electrical bridge, may be used for the same purpose.

Figure 7:
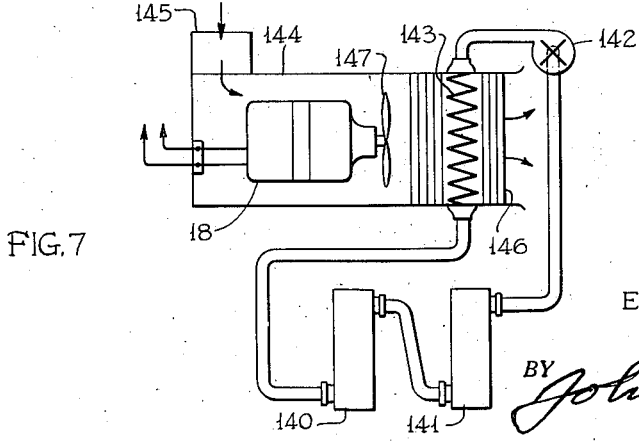
Figure 7 is a view illustrating a method of cooling the ignitrons of the circuit.

While emphasis has been laid upon the circuit arrangement and elements incorporated therewith, it is, of course, apparent that compactness is facilitated by structural arrangement and improvements in the accessory physical apparatus. For example, in the case of the ignitron tubes, while ordinary gravity circulation may be employed for cooling, the efficiency of the tubes may be increased considerably by employing forced circulation cooling methods, such as indicated in the arrangement of Figure 7. In this figure, the numerals 140 and 141 indicate two ignitrons, and through these ignitrons is connected a cooling circuit including the fluid pump 142 and the heat radiator section 143. The radiator section 143 is cooled by means of an air current passing through the chamber 144, through the inlet 145 to the outlet 146, the air flow being controlled by the fan 147 of motor 18, this motor receiving power from the branch circuit across primary coil 7 of transformer 4. By this means, a positive cooling of the current through the ignitrons is obtained which appreciably improves the efficiency of the system.

While specified values and uses are hereinabove indicated, changes and modifications may be made to accommodate the apparatus to particular requirements. For example, while a 60-cycle frequency of current is mentioned, operation of the system is not dependent upon this frequency. The two-part transformer including the primary and secondary is illustrated and described as separating the power source from the work circuit. I have found that an autotransformer is also usable and satisfactory for the purposes of my invention. The autotransformer has particular utility when weight is a factor of extraordinary importance.

Figure 2:
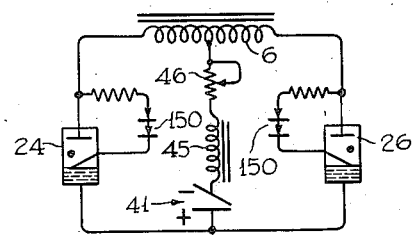
Figure 2 is a diagram illustrating the circuit of Figure 1 as utilized for high current.

Also while I have indicated rectifying diodes for the ignitrons, other rectifiers, such as the copper oxide type 150 shown in Figures 2 and 3, may be employed.

While the circuit described is primarily for the accomplishment of arc welding, a variety of other uses is possible, such for example as battery charging or application to rotating dynamo-electric equipment or the like.

In view of the various modifications and uses hereinabove referred to, I do not desire to limit my invention to the indicated disclosure, the elements of the invention being defined only by the scope of the claims hereto appended.

What is claimed is:

1. An arc welder system comprising power terminals, a transformer, a center tap connected to said transformer, rectifying tubes, each having a cathode and anode, connected with the cathodes joined together in opposition and across said transformer, welding electrodes and a reactor connected in series with each other between the center tap of the transformer and the tube cathodes to form a branch circuit through which current is transmitted from each rectifier in succession on application of alternating current power to said transformer, and switching means for shifting the connection of said branch circuit from the transformer center tap to the anode of one of said rectifying tubes whereby said reactor is made effective to discharge through the tube including said anode.

2. An arc welder system comprising power terminals, a transformer, a center tap connected to said transformer, rectifying tubes, each having a cathode and anode, connected with the cathodes joined together in opposition and across said transformer, welding electrodes and a reactor connected in series with each other between the center tap of the transformer and the tube cathodes, to form a branch circuit through which current is transmitted from each rectifier in succession on application of alternating current power to said transformer, switching means for shifting the connection of said branch circuit from the transformer center tap to the anode of one of said rectifying tubes whereby said reactor is made effective to discharge through the tube including said anode, and a variable resistor in said branch circuit effective in either of said switch positions.

3. An arc welder system comprising power terminals, a transformer, a center tap connected to said transformer, rectifying tubes connected with the cathodes joined together in opposition and across said transformer, said tubes including a cathode, anode and control element, welding electrodes connected between the center tap of the transformer and the tube cathodes to form a branch circuit through which current is transmitted from each rectifier in succession on application of alternating current power to said transformer, means connected with the tube control elements for passing alternate flow of current through said tubes, switching means for shifting the connection of said branch circuit from the transformer center tap to the anode of one of said rectifying tubes whereby said reactor is made effective to discharge through the tube including said anode, and means including an energy storage device connected in series with said welding electrodes for securing continuity of current flow through said welding electrodes when said switch is connected to the end terminal of said transformer.

4. A power supply system comprising a source of alternating current, a load, an energy storage means connected to said load, a first power rectifier connected to said source in parallel with said load and storage means, a second power rectifier connected to said source in parallel with said load and storage means to supply power through the first rectifier to said load and storage means in intermittent half-cycles of source current flow and additional means for supplying power to said load at will either from said source or from said storage means only through the second rectifier during the time intervals between said intermittent half-cycle power supply.

5. A power supply system comprising a power source, a load, means including a first rectifier tube for supplying energy to said load during intermittent half-cycles from said power source, additional means including a second rectifier tube connected to said load for supplying power to said load in the time interval between the half cycles of source supply, said additional means receiving and storing energy during the time periods when energy is being supplied the load from said source, and means for varying the fraction of the intermittent half cycles of source-power application in which said source is effective at the load.

6. An arc welder system comprising power terminals, a transformer, rectifying tubes connected in series across said transformer, said tubes including a cathode, anode and control element, welding electrodes and a reactor connected in series with each other to form the branch circuit between an anode of one of said tubes and the tube cathodes, means connected with the tube control elements for causing alternate flow of current through said tubes, and a variable resistance connected in said branch circuit for varying the power supply through said electrodes.

7. A power supply system comprising a power source, a load, means including a first rectifier tube for supplying energy to said load during intermittent half cycles from said power source, additional means including a second rectifier tube connected to said load for supplying power to said load in the time interval between the half cycles of source supply, said additional means receiving and storing energy during the time periods when energy is being supplied the load from said source, and means for varying the fraction of the intermittent half cycles of source-power application as well as the fraction of stored energy discharge in which the power is effective on the load, said last-named means including a voltage regulator.

8. An arc welder system comprising power terminals, a transformer, rectifying tubes connected in series across said transformer, said tubes including a cathode, anode, and control element, welding electrodes and a reactor connected in series with each other to form a branch circuit between an anode of one of said tubes and the tube cathodes, and means connected with the tube elements for causing alternate flow of current through said tubes, said transformer supplying current directly to one of said tubes only.

EDWIN M. CALLENDER.

REFERENCES CITED

The following references are of record in the file of this patent:

UNITED STATES PATENTS

| Number | Name | Date |
|---|---|---|
| 2,065,280 | Koros | Dec. 22, 1936 |
| 1,686,974 | Kroger | Oct. 9, 1928 |
| 1,845,979 | Hyneman | Feb. 16, 1932 |
| 2,122,393 | Robinson | May 16, 1939 |
| 1,329,532 | Lincoln | Feb. 3, 1920 |
| 1,849,103 | Maxson | Mar. 15, 1932 |
| 1,961,197 | Churchward | June 5, 1934 |
| 1,969,550 | Evans | Aug. 7, 1934 |
| 1,994,907 | Dawson | Mar. 19, 1935 |
| 2,070,501 | Westendorp | Feb. 9, 1937 |
| 2,255,141 | Weir | Sept. 9, 1941 |
| 2,259,295 | Cox | Oct. 14, 1941 |
| 2,259,329 | Slepian | Oct. 14, 1941 |
| 2,326,550 | Mittag | Aug. 10, 1943 |
| 2,359,144 | Myers | Sept. 26, 1944 |
| 2,359,181 | Willis | Sept. 26, 1944 |